United States Patent
McBryde et al.

(10) Patent No.: US 9,595,845 B2
(45) Date of Patent: Mar. 14, 2017

(54) METHODS AND SYSTEMS FOR EMERGENCY LIGHTING

(71) Applicant: Cree, Inc., Durham, NC (US)

(72) Inventors: James McBryde, Raleigh, NC (US); James Michael Lay, Apex, NC (US); Chris Simonsen, Youngsville, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/541,913

(22) Filed: Nov. 14, 2014

(65) Prior Publication Data

US 2016/0141914 A1   May 19, 2016

(51) Int. Cl.
  *H05B 37/00*  (2006.01)
  *H02J 9/02*  (2006.01)
  *H05B 33/08*  (2006.01)

(52) U.S. Cl.
  CPC ............ *H02J 9/02* (2013.01); *H05B 33/0845* (2013.01); *H05B 33/0887* (2013.01)

(58) Field of Classification Search
  CPC .......... H05B 35/00; Y10T 7/615; Y10T 7/391
  USPC .............. 315/86; 307/64, 66, 23, 25, 29, 65; 340/693.1, 693.2, 693.4, 333, 541
  See application file for complete search history.

(56) References Cited

U.S. PATENT DOCUMENTS

| | | | |
|---|---|---|---|
| 4,977,351 A * | 12/1990 | Bavaro | H02J 9/065 307/66 |
| 8,415,901 B2 * | 4/2013 | Recker | H05B 33/0803 315/172 |
| 8,491,159 B2 * | 7/2013 | Recker | H02J 9/02 362/20 |
| 8,946,991 B2 * | 2/2015 | Gordin | H02J 9/065 315/86 |
| 9,107,269 B2 * | 8/2015 | Martin | H05B 33/0884 |
| 9,125,255 B2 * | 9/2015 | Ramer | H05B 37/0245 |
| 2009/0154148 A1 * | 6/2009 | Meyer | F21L 2/00 362/157 |
| 2011/0068692 A1 * | 3/2011 | Tian | H05B 33/0815 315/113 |
| 2013/0127362 A1 | 5/2013 | Trainor et al. | |
| 2013/0147397 A1 | 6/2013 | McBryde et al. | |
| 2014/0001959 A1 | 1/2014 | Motley et al. | |
| 2014/0132164 A1 | 5/2014 | McBryde et al. | |

* cited by examiner

*Primary Examiner* — Thuy Vinh Tran
(74) *Attorney, Agent, or Firm* — Steven B. Phillips; Moore & Van Allen PLLC

(57) ABSTRACT

Methods and systems for emergency lighting are disclosed. Embodiments of the invention provide a solid-state lighting system, light fixture or a collection of light fixtures, with a control input that is used to cause the system to dim to a specific level during an outage in order to conserve power in a building where power is backed up by an emergency inverter or a back-up generator. With embodiments of the invention, there is no need to run a separate power feed, as might otherwise be required for keeping distributed batteries charged or for running specified emergency-only fixtures from back-up power. In some embodiments the solid-state lighting system includes an occupancy sensor wherein the specified light output level is determined at least in part based on the occupancy of a room. In some embodiments, the system can be selectively configured for the specified output level.

19 Claims, 10 Drawing Sheets

METHODS AND SYSTEMS FOR EMERGENCY LIGHTING

BACKGROUND

Emergency lighting is premises lighting that is activated in the event of power loss. One purpose of emergency lighting is to allow occupants of a building to safely exit the building in the event of a power outage or other emergency. Emergency lighting is mandated for use in commercial buildings by many electrical codes. Such codes generally specify the amount of light that must be provided in the event of power loss and the duration of time for which such light must be provided. For example, U.S. building codes require emergency lighting to provide one footcandle of light for a minimum of 90 minutes along the path of egress during a power outage.

In some buildings, emergency lighting is provided by battery-powered emergency light fixtures that are installed in a building along with the luminaires that provide light in non-emergency situations. In some systems, emergency lights are powered by a central bank of batteries. If regular fixtures are used as emergency lights, the central bank of batteries can include an inverter to provide normal AC power to the emergency lights. Building codes generally required the wiring from the central power source to emergency luminaires to be isolated from other electrical wiring. In some buildings, a generator provides normal AC power to all or selected light fixtures during a power outage.

Centralized types of emergency power can be used for light emitting diode (LED) lighting systems, which are becoming more prevalent as replacements for legacy lighting systems. LED systems are an example of solid state lighting (SSL) and have advantages over traditional lighting solutions such as incandescent and fluorescent lighting because they use less energy, are more durable, operate longer, can be combined in multi-color arrays that can be controlled to deliver any color light, and generally contain no lead or mercury. A solid-state lighting system may take the form of a luminaire, lighting unit, light fixture, light bulb, or a "lamp."

An LED lighting system may include, for example, a packaged light emitting device including one or more light emitting diodes (LEDs), which may include inorganic LEDs, which may include semiconductor layers forming p-n junctions and/or organic LEDs, which may include organic light emission layers. Light perceived as white or near-white may be generated by a combination of red, green, and blue ("RGB") LEDs. Output color of such a device may be altered by separately adjusting supply of current to the red, green, and blue LEDs. Another method for creating white or near-white light is by using a lumiphor such as a phosphor. Still another approach for producing white light is to stimulate phosphors or dyes of multiple colors with an LED source. Many other approaches can be taken.

SUMMARY

Embodiments of the present invention provide a solid-state lighting system, possibly an LED light fixture or a collection of light fixtures, with a control input that is used to command the system and/or fixture(s) to dim to a specific level during an outage in order to conserve power. Embodiments of the invention can find use, for example, in a building where power is backed up by an emergency inverter or a back-up generator. With embodiments of the invention there is no need to run a separate power feed, as might otherwise be required for keeping distributed batteries charged or for running specified emergency-only fixtures from back-up power.

A solid-state lighting system according to example embodiments can include a driver to drive a primary light source, wherein the driver is connectable to a power line, which is in turn selectively connected to main and back-up power. The system can also include a control input to cause the solid-state lighting system to dim to a specified light output level when the power line is connected to back-up power. In some embodiments, the control input causes the system to switch from a main light source to an auxiliary light source. In some embodiments, the control input causes the main light source to dim to the specified light output level. In some embodiments the solid-state lighting system includes an occupancy sensor wherein the specified light output level is determined at least in part by an occupancy state of a room. In some embodiments, the system can be selectively configured for a specified output level, for example to provide a level specific to egress lighting.

In some embodiments, the control input of the solid-state lighting system is responsive to either the presence or absence of a wireless signal. In some embodiments, the control input is responsive to a perturbation on the power line. In some embodiments, the control input is responsive to a wired signal. The wired signal can be, for example, the closure of a normally open wired contact, the opening of a normally closed wired contact, or more complex signaling.

In some embodiments the solid-state lighting system is or includes a light fixture further including a plurality of LEDs, and a driver connected to the plurality of LEDs to receive power from a power line connected to the light fixture and supply power to the LEDs. A control input can be connected to the driver and configured through electrical circuitry or firmware to cause the driver to dim at least some of the plurality of LEDs to a specified level when it is determined that the power line is being supplied with back-up power. An occupancy sensor can be connected to the driver wherein the specified level of light from the LEDs when dimmed is further determined by signaling from the occupancy sensor. Other types of sensors can also provide signaling input. The light fixture can include a configuration input connected to the driver and/or the control input, wherein the configuration input allows a user or installer to set the specified level. In some embodiments, the configuration input selectively sets the specified level for egress lighting.

Example embodiments of the invention operate by monitoring for a power interruption which causes power on the power line to be supplied by a back-up power source in lieu of the normal power mains. The lighting system is then dimmed to a specified level when it is determined that the power is being supplied by the back-up power source. The specified level can be selected to reduce power consumption by the lighting system. The monitoring can be accomplished through electrical circuitry, a specific input, an appropriate application specific integrated circuit, and/or an appropriate processor executing firmware or software to operate the system. As previously mentioned, the occupancy status and/or a setting by a user or installer can be taken into account.

BRIEF DESCRIPTION OF THE DRAWINGS

FIG. 3 is presented with a portion of the light fixture cut away for clarity.

FIG. 4 is presented with portions of the lighting system cut away for clarity.

FIG. 5 is presented with portions of the lighting system cut away for clarity.

DETAILED DESCRIPTION

Figure 1:
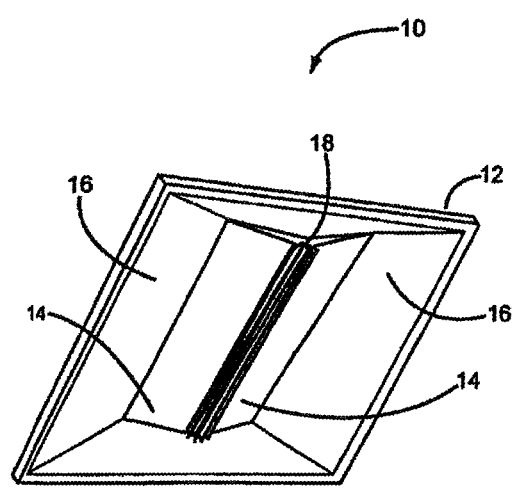
FIG. 1 is a perspective view of a light fixture according to example embodiments of the present invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid-state light emitter" or "solid-state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid-state light emitters and/or multiple lumiphoric materials (i.e., in combination with at least one solid-state light emitter) may be used in a single device, such as to produce light perceived as white or near-white in character. In certain embodiments, the aggregated output of multiple solid-state light emitters and/or lumiphoric materials may generate warm white light output having a color temperature range of from about 2700K to about 4000K.

Solid-state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid-state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials may be associated with a lumiphor, a lumiphor binding medium, or a lumiphor support element that may be spatially segregated from a solid-state emitter.

Example embodiments of the invention enable a solid-state lighting system, light fixture, or collection of light fixtures to include a control input that is used to command the fixture to dim to a specific level during an outage. Such a system can be used in a building where the power mains are backed up by an emergency lighting inverter, or a back-up generator. Such control can allow a building architect to size the battery/inverter combination or back-up generator such that it offers the exact amount of power to run lights at that specific level during an outage. The backup system can be sized for the minimum light output needed to meet code requirements. With an embodiment of the invention, there is no need to run a separate power feed for specific emergency lighting fixtures or to keep distributed batteries charged. Additionally, fixtures could be configured at installation to choose a specific light output that provides exactly the needed amount of light needed.

A solid-state lighting system according to example embodiments can detect the power outage by a wired control signal, a wireless signal sent over the air, or the absence of a wireless signal (when power goes away and the network goes down the fixture knows to go to dimmed emergency mode). Additional functionality can be implemented in response to sensors, for example, an occupancy sensor built into a fixture. A distinction could be made so that occupied spaces are illuminated by a higher light output during emergency mode, for example 1.0 footcandles when a space is occupied vs. 0.5 footcandles when a space is unoccupied. A standardized LED light fixture could also be identified as being in the path of egress, for example, with a configuration input that is set by an installer. The system could then be configured such that only those fixtures in the path of egress are illuminated during an outage, or those fixtures in the path of egress are illuminated at a different brightness level.

Figure 2:
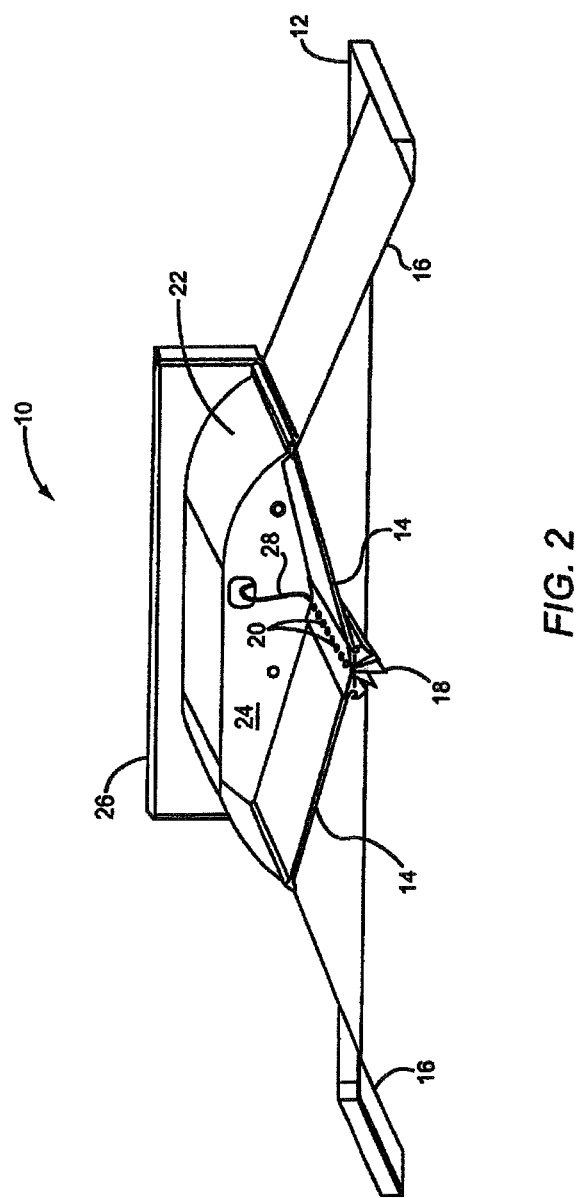
FIG. 2 is a cutaway view of the light fixture of FIG. 1.
Figure 3:
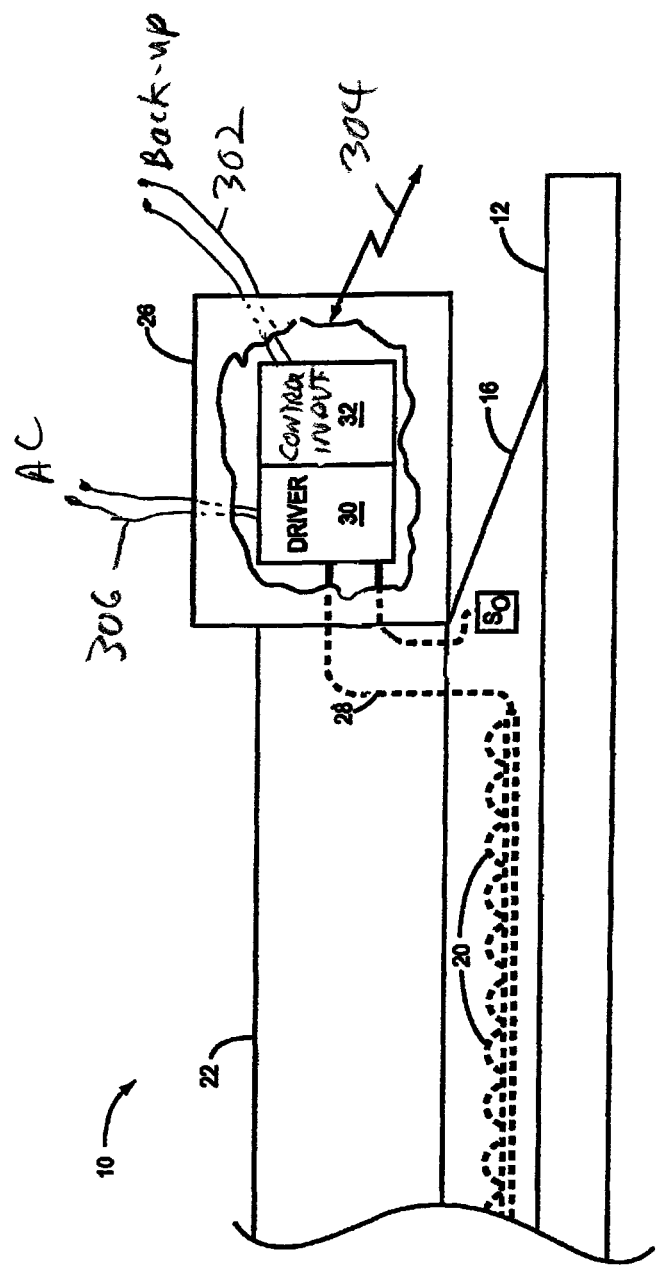
FIG. 3 is a schematic side view of the light fixture of FIGS. 1 and 2.

As an example solid-state lighting system implementing an embodiment of the invention, consider a troffer-type light fixture, such as the lighting fixture 10, shown in FIGS. 1, 2 and 3. Troffer fixtures like fixture 10 are designed to mount in a ceiling. In most applications, the troffer-type lighting fixtures are mounted into a drop ceiling (not shown) of a commercial, educational, or governmental facility. As illustrated in FIGS. 1-3, the lighting fixture 10 includes a square or rectangular outer frame 12. In the central portion of the lighting fixture 10 are two rectangular lenses 14, which are generally transparent, translucent, or opaque. Reflectors 16 extend from the outer frame 12 to the outer edges of the lenses 14. The lenses 14 effectively extend between the innermost portions of the reflectors 16 to an elongated heat sink 18, which functions to join the two inside edges of the lenses 14.

Still referring to FIGS. 1-3, the back side of the heatsink 18 provides a mounting structure for a plurality of LEDs 20, which includes one or more rows of individual LEDs mounted on an appropriate substrate. The LEDs are oriented to primarily emit light upwards toward a concave cover 22. The volume bounded by the cover 22, the lenses 14, and the back of the heatsink 18 provides a mixing chamber 24. As such, light will emanate upwards 30 from the LEDs of the plurality of LEDs 20 toward the cover 22 and will be reflected downward through the respective lenses 14. Notably, not all light rays emitted from the LEDs will reflect directly off of the bottom of the cover 22 and back through a particular lens 14 with a single reflection. Many of the light rays will bounce around within the mixing chamber 24 and effectively mix with other light rays, such that a desirably uniform light is emitted through the respective lenses 14. The type of lenses 14, the type of LEDs, the shape of the cover 22, and any coating on the bottom side of the cover 22, among many other variables, will affect the quantity and quality of light emitted by the light fixture 10.

The plurality of LEDs 20 may include LEDs of different colors, wherein the light emitted from the various LEDs mixes together to form a white light having a desired color temperature and quality based on the design parameters for the fixture. As is apparent from the Figures, the elongated fins of the heatsink 18 may be visible from the bottom of the lighting fixture 10. Placing the LEDs in thermal contact along the upper side of the heatsink 18 allows any heat generated by the LEDs to be effectively transferred to the elongated fins on the bottom side of the heatsink 18 for dissipation within the room in which the lighting fixture 10 is mounted. Again, the particular configuration of the lighting fixture 10 is one of virtually limitless configurations for solid-state lighting systems in which the concepts of the present disclosure are applicable.

FIG. 3 shows a view of fixture 10 in which an electronics housing 26 is visible mounted at one end of the lighting fixture, and is used to house all or a portion of the electronics used to power and control the plurality of LEDs 20. These electronics are coupled to the LEDs through appropriate cabling 28. In this example, the electronics include two functional units included in a unitary electronics assembly, a driver 30 and a control input 32. Driver 30 is coupled to the LEDs through the cabling 28 and directly drives the LEDs 20, in part based on control information provided by the control input 32. The driver 30 provides the intelligence for the light fixture 10 and is capable of driving the LEDs 20 in a desired fashion. It should be noted that all of the electronics for the fixture together can sometimes be referred to as the "driver" for a light fixture, and that could be the case for example embodiments such as those described herein.

The control input 32 acts as an intelligent communication interface that can monitor the power supplied to the fixture and determine whether the system is connected to main power or is connected to back-up power due to a power outage. When the system is connected to back-up power, the control input 32 can cause the driver to reduce the brightness at least some of LEDs 20 to a specified level to lower the brightness and power consumption of fixture 10. All the LEDs can be dimmed equally or selected LEDs can be dimmed a specified amount, with other being dimmed other amounts to also affect the color or other characteristics of the light. In some embodiments, the control input can receive a signal through wired connection 302. In example embodiments, this signal can be a "contact closure" where the two lines in the connection are shorted to indicate to fixtures that emergency power is engaged. The wired signal can also be the opening of "normally closed" or shorted wires, or a specified data signal sent over the lines to the control input.

Alternatively, fixture 10 can receive a wireless signal 304 to indicate that the building is on back-up power. Such a wireless signal can be a pulse, or a more complex data signal, and could be delivered through radio frequency (RF) means or in some systems possibly even infrared light. The absence of a wireless signal, as when power is lost and a wireless control network goes down, can also cause the control input to trigger the fixture to dim. The use of wireless signaling can make a solid-state lighting system according to embodiments of the invention easy to retrofit to existing premises.

With appropriate digital signal processing hardware in the control input of FIG. 3, it is also possible to detect a "switch-over" to back-up power by analyzing any perturbation in the voltage and/or current of the power coming in over AC power supply line 306, which is connected to main and back-up power and switched between the two as needed. Such an arrangement would not require any additional external signaling, and would therefore also be very useful in retrofitting existing premises. When the power mains in the building switch from external AC power to a back-up generator or inverter, the switchover causes momentary discontinuities in the sine wave supplied to the fixture. Minute continuous characteristics of the voltage or current sine wave can be altered as well. Digital signal processing techniques can be used to compare samples being taken in real-time or near real-time from power line 306 to reference samples stored in memory in order to determine when back-up power has been engaged for the power on the power line. It should be noted that two or more of the aforementioned detection techniques can be combined.

As should be apparent, the control input can vary in complexity. It may consist of anything from a connector and wiring all the way up through a digital signal processor with memory and firmware, or other type of appropriate processing device. Wireless communication hardware and/or software can also be included. The hardware and/or software needed for the control input depends on the way the determination is being made as to when back-up power has been engaged, and may depend on the design of the driver.

The fixture shown in FIG. 3 includes an occupancy sensor (So) connected to driver 30. In normal operation, this occupancy sensor can determine if there is somebody in the room where the fixture is installed and activate the LEDs to provide light. When the room is unoccupied, after a programmable delay the fixture can shut off to save energy. With embodiments of the present invention, the level of emergency lighting can be set depending on the occupancy status of a room. That is, whether anyone is in the room. Occupancy as determined by signaling from the occupancy sensor can serve an additional input into the system. For example, the system can provide a lower level of or no emergency lighting when a room is un-occupied, or a higher level of emergency lighting when the room is occupied. The higher level of emergency lighting would still be dimmed relative to the brightness when operating from "normal" or main power.

Figure 4:
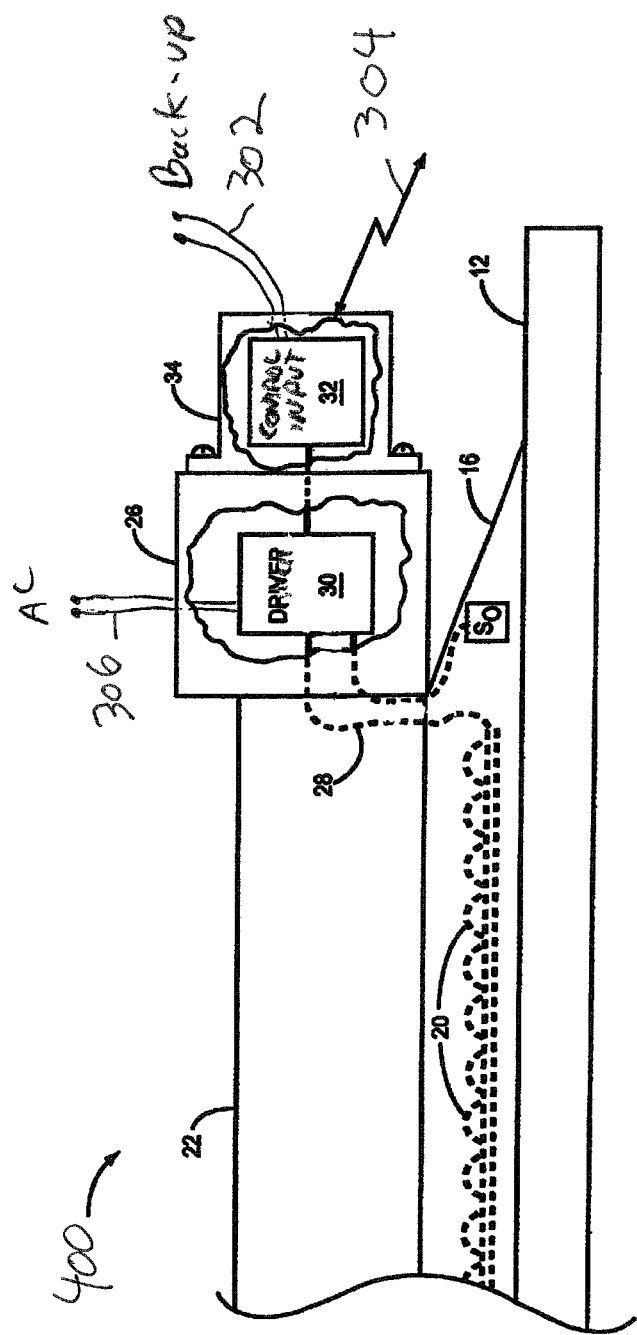
FIG. 4 is a schematic side view of a lighting system according to example embodiments of the present invention.

FIG. 4 illustrates another solid-state lighting system 400 according to example embodiments of the invention. Much of the system shown in FIG. 4 is identical to the one shown in FIGS. 1, 2, and 3; however in FIG. 4, the control input 32 is in a separate housing 34, and attached to driver 30 by a cable. The use of a supplemental housing 34, which may be directly or indirectly coupled to the outside of the driver housing 26, allows for modular assembly of different fixtures with various means for determining when back-up power has been engaged. It also allows for easier repair or replacement of the control input circuitry. Finally, if the system is to use wireless signaling for determination of when back-up power has been engaged, external housing 34 can be made of materials that facilitate wireless signal transmission, such as plenum rated plastic.

Figure 5:
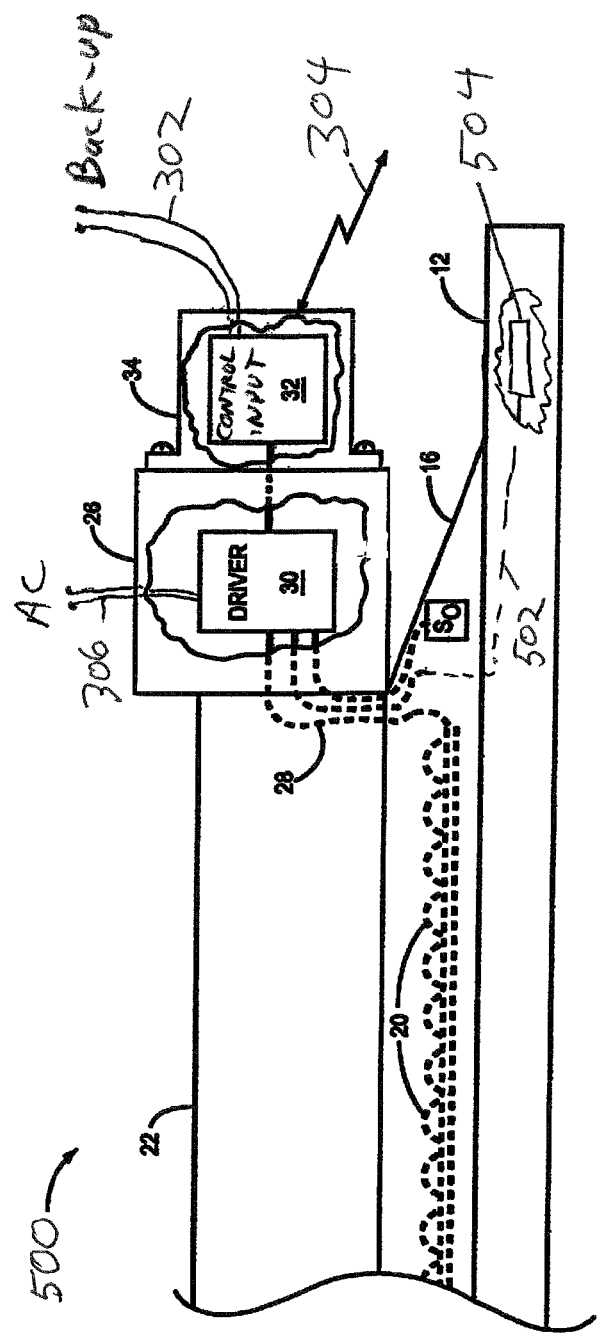
FIG. 5 is a schematic side view of a lighting system according to additional example embodiments of the present invention.

FIG. 5 illustrates another example solid-state lighting system according to embodiments of the invention. Many of the components of system 500 are the same or similar as those shown in FIG. 4. However, in order to accomplish the power reduction when the system is on back-up power, system 500 switches the light source from main light source 20, the plurality of LEDs that provide normal lighting, to an auxiliary light source connected to the driver by cable 502. In this example embodiment, the auxiliary light source is small, LED lighting device 504, which produces less light and consumes less power. In the example of FIG. 5, the auxiliary light source is connected to the same driver, and installed within the same light fixture, as the main light source. However, in other embodiments, the auxiliary light source could be connected to a different driver, and/or could be installed outside of the light fixture.

The auxiliary light source as described above is a lighting module that is designed to be illuminated during an outage. The lighting module can be very small and still provide the required illumination for egress lighting, as small as on the order of 1"×1"×2" in size. The module could accept AC voltage as an input and the module itself could detect an outage condition in any of the ways previously discussed. In such a case, the control input of the system would reside in the auxiliary module as opposed to in the main light fixture. Thus the system would effectively switch from the main to the auxiliary light source without any special hardware or switching associated with the main light source, which would simply shut off in an outage when the auxiliary module turns on. In some embodiment, the module could be suspended by aircraft cable completely independent of a fixture, or it could physically snap onto or into a light fixture as part of a retrofit for an embodiment of the invention. The module can be designed such that it aesthetically integrates physically into the fixture and looks seamless. Such an auxiliary module could also be designed to mount on the wall or on a t-grid for a drop-ceiling.

Figure 6:
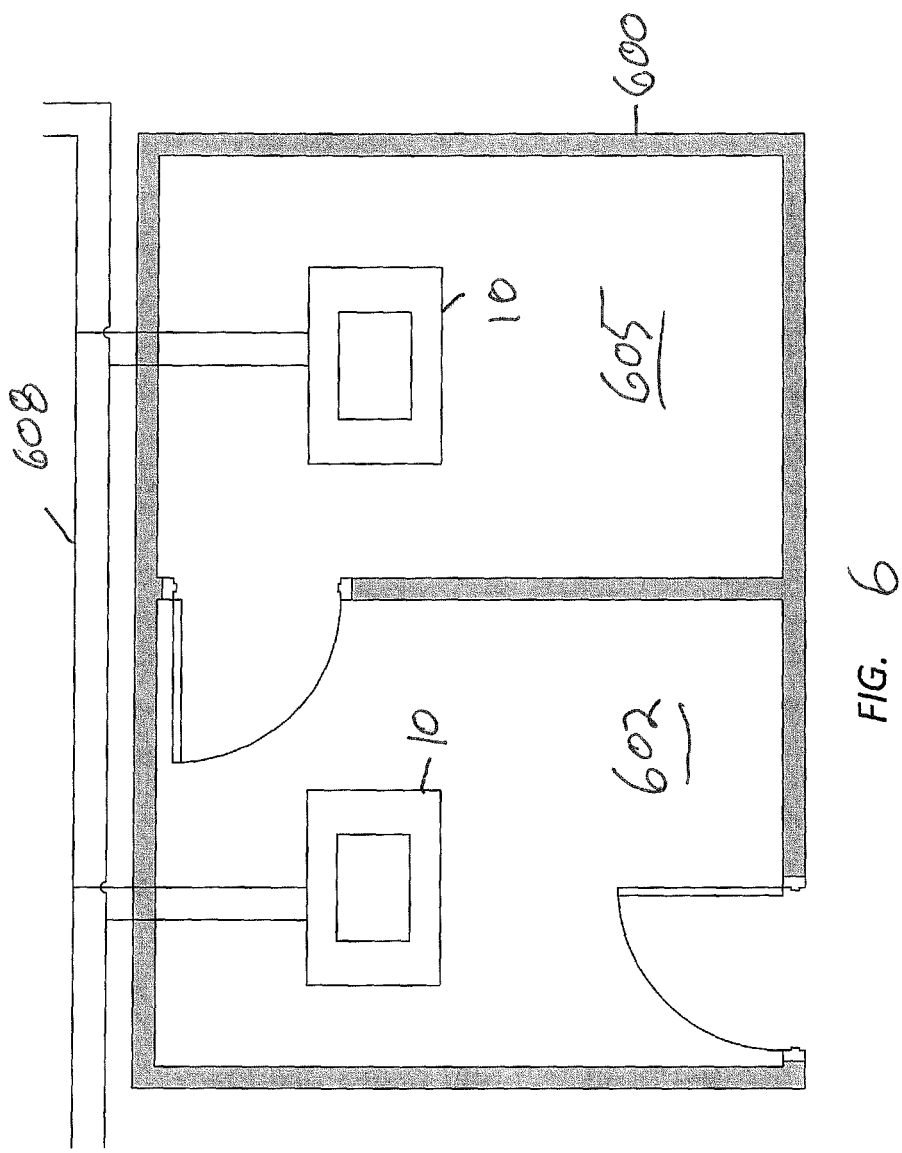
FIG. 6, FIG. 7, FIG. 8, and FIG. 9 show various arrangements of light fixtures according to various embodiments of the present invention and example operating environments for embodiments of the invention.

FIGS. 6, 7, 8, and 9 illustrate various operating environments and configurations for solid-state lighting systems according to embodiments of the present invention. In all illustrated example cases, the lighting systems are responsive to a wired signal, namely a closure of a normally open contact or circuit. FIG. 6 illustrates a building or portion of a building, 600, in which light fixtures 10 are deployed. One fixture is installed in room 602, and another fixture is installed in room 605. The fixtures are connected essentially in parallel to a wired connection 608, which in effect acts like a system bus. When there has been a power interruption and premises 600 switches to a backup generator or inverter, the two lines in wired connection 608 are shorted, signaling fixtures 10 to dim for reduced power consumption.

Figure 7:
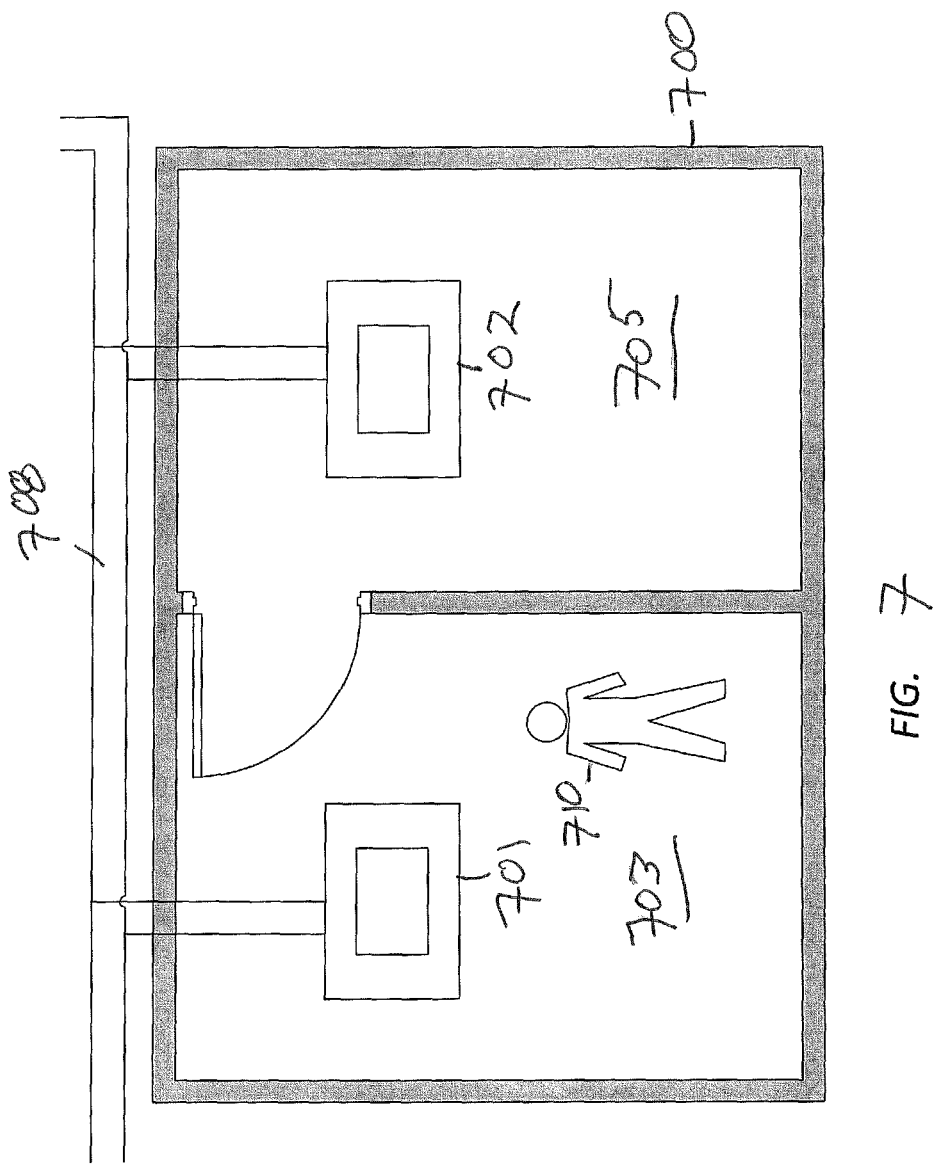

FIG. 7 illustrates a building or portion of a building, 700, in which light fixtures 701 and 702 are deployed. Fixture 701 is installed in room 703, and fixture 702 is installed in room 705. The fixtures are again connected essentially in parallel to a wired connection 708, which in effect acts like a system bus. When there has been a power interruption and the power line through premises 700 is being supplied by back-up power, the two lines in wired connection 608 are shorted, signaling fixtures 701 and 702 to dim for reduced power consumption. In the case of FIG. 7, fixture 701 dims to a different level than fixture 702, because the occupancy sensor of fixture 701 senses the presence of a person 710 in room 703. In some embodiments, the specified brightness at the "dimmed" level can be selected or programmed at installation time. With the occupancy sensor for example, it is typically desirable to have occupied rooms lit to a brighter level than unoccupied rooms. The fixtures could also be programmed so that they are allowed to shut off completely in unoccupied rooms. The level to which the system dims in an embodiment of the invention can be referred to herein as a "specified level", "selected level", "preselected level," or the like. The level could be fixed by the manufacturer, determined at installation time or at any time through the use of configuration inputs (see FIG. 9), determined by other inputs or sensors in the system, or some combination of the foregoing. In some circumstances, the specified level can be zero.

Figure 8:
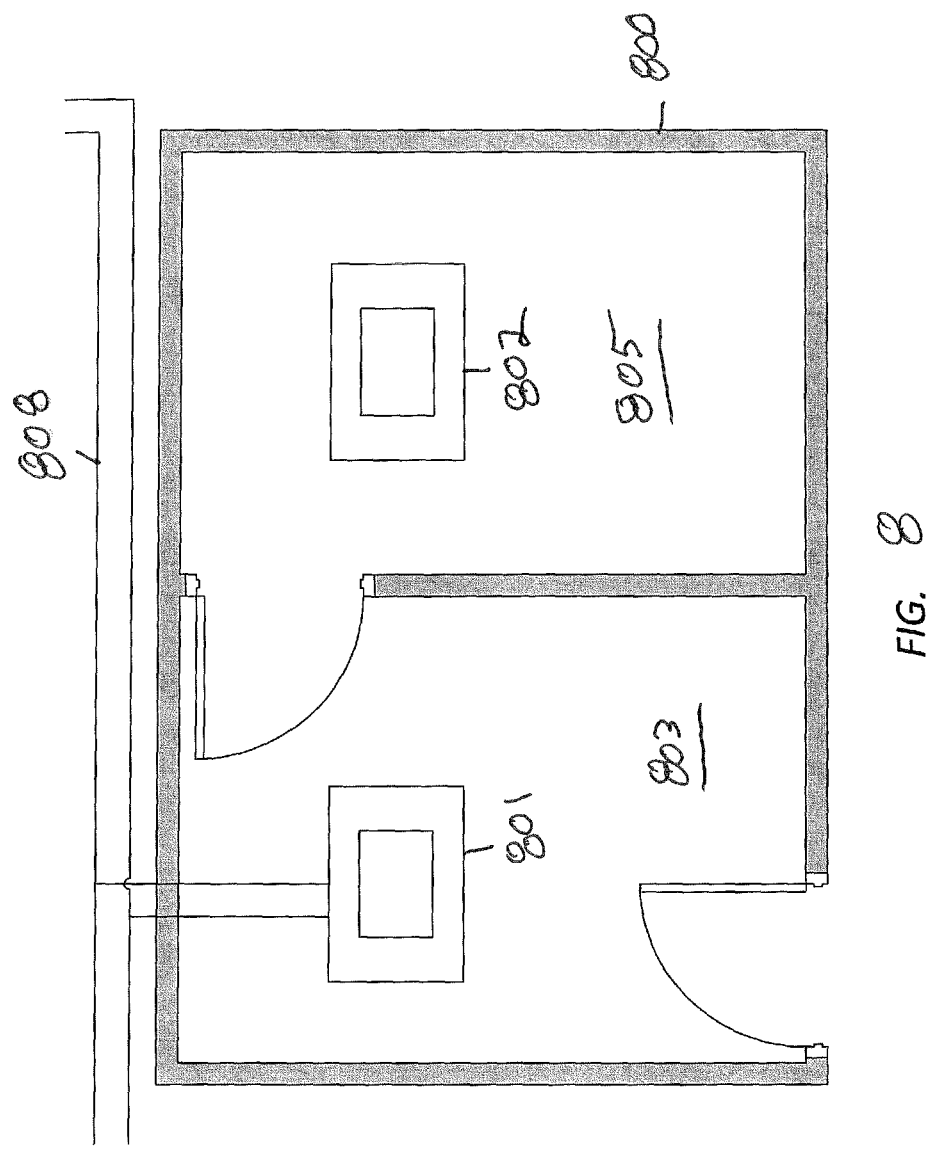

FIG. 8 illustrates a building or portion of a building, 800, in which light fixtures 801 and 802 are deployed. In this case, the concern is only for paths of egress. As such, only fixture 801, which is installed in room 803 having an outside door, includes the power conserving dimming function according to embodiments of the invention. Fixture 802 in room 805 is an ordinary fixture and will simply go out when main power is lost. As can be observed, only fixture 801 is connected to wired connection 808 to receive signaling that there is an outage and the power line is on back-up power. There are likely other paths of egress (not shown) in building 800 where additional solid-state fixtures or lighting systems could be installed.

Figure 9:
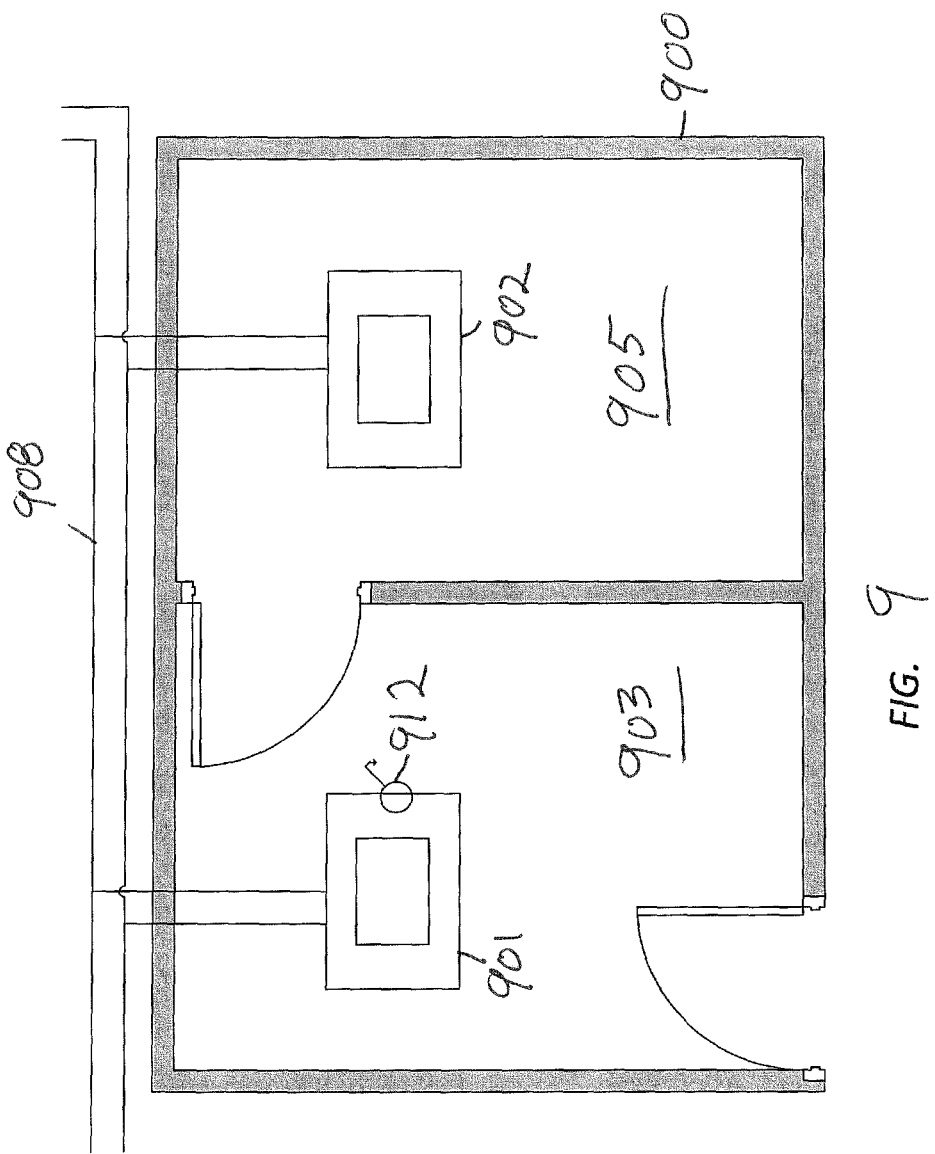

FIG. 9 illustrates another way of handling lighting for paths of egress according to example embodiments of the present invention. FIG. 9 shows a building or portion of a building, 900, in which light fixtures 901 and 902 are deployed. Fixture 901 is installed in room 903, and fixture 902 is installed in room 905. The fixtures are again connected essentially in parallel to a wired connection 908. When there has been a power interruption and the power line through premises 900 is being supplied by back-up power, the two lines in wired connection 908 are shorted, signaling fixtures 901 and 902 to dim for reduced power consumption. In the case of FIG. 9, fixture 901 dims to a different level than fixture 902, because fixture 901 illuminates a path of egress. System 901 in this embodiment includes a configuration input 912, which is a switch that can be set at installation time to tell the electronics in system 901 that that particular fixture is being used for egress lighting. In this example, it is typically desirable to have the egress path lit to a brighter level than other rooms. The fixtures could also be programmed so that they were allowed to shut off completely if the configuration input was not set for egress. This would effectively make the wired connection 908 unused by fixture 902; however, such a configuration option may be useful if there is a desire to install the same model for all fixtures using the same wiring harness.

An egress indication is only one example of a use for a configuration input. Such an input could also be used to allow the occupancy sensor to affect the light output during an outage, to cause the system to take other sensors into account, such as an ambient light sensor that could be part of a system, or to select a different "dimmed" or regular light level for an indoor vs. and outdoor system or fixture. Also, a system could be designed so the configuration input can be changed at any time, not merely set during installation. The configuration input could also be a remote, wired or wireless control function, or set by alterations to firmware through a service port.

Figure 10:
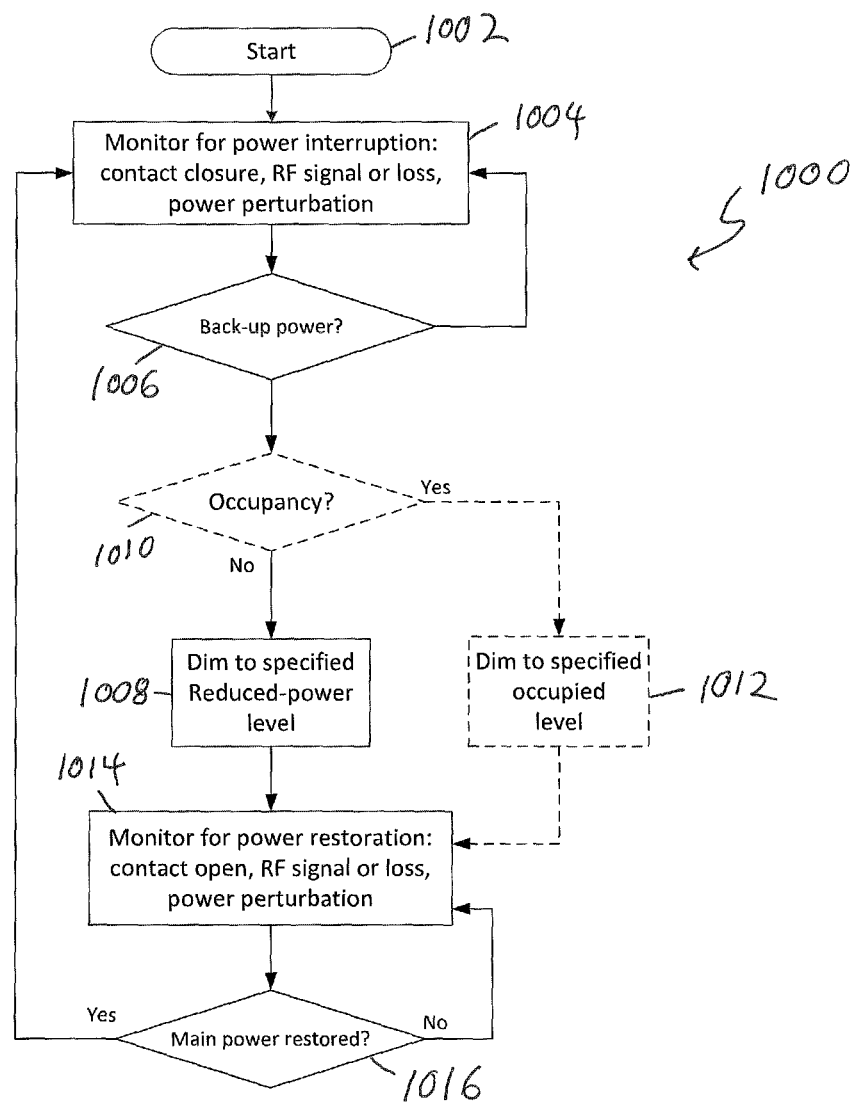
FIG. 10 is a flowchart illustrating the operation of at least some example embodiments of the present invention.

FIG. 10 shows a flowchart illustrating a process 1000 as implemented by a system according to example embodiments of the present invention. Like most flowcharts, FIG. 10 illustrates process 1000 has a series of process or sub-process blocks. The process starts at block 1002. At block 1004, the system monitors for power interruption by whatever means has been included in the system for this purpose. As previously discussed, this monitoring can be via a wired connection, as in contact closure or opening, a specified radio frequency (RF) signal, the loss of an RF signal, or by detecting a perturbation on the main power line, to name a few examples. If it is detected at block 1006 that backup power has been engaged, that is, that there has been a power interruption, processing branches in some embodiments to block 1008, where the system dims to the specified level for reduced power consumption as previously discussed. Otherwise, monitoring continues at block 1004.

Still referring to FIG. 10, optionally, in some embodiments, the status of occupancy is determined at block 1010, as in by a signal from an occupancy sensor as previously discussed. In such an embodiment, if the room is occupied, the system dims to a specific occupied level at block 1012. Otherwise, the system dims to a "normal" or unoccupied level at block 1008. At block 1014, the system monitors for power restoration through any of the previously discussed means, or their inverse. For example, if backup power was indicated by the loss of an RF signal, power restoration might be indicated by the restoration of an RF signal. If main power is restored at block 1016, processing returns to block 1004 were the system again monitors for power interruption. Otherwise, monitoring for power restoration continues at block 1014.

The example embodiments described in this disclosure or alternative embodiments may have control functions executed by or implemented as discrete electronic components or a processing device such as an embedded controller or digital signal processor (DSP). A more general purpose microprocessor such as one of the many variants of ARM processors could also be used. A suitable processing device could also be implemented on a field programmable gate array (FPGA), or on an application specific integrated circuit (ASIC).

In some embodiments, non-transitory firmware, software, or microcode can be stored in a tangible storage medium that is associated with a processing device. Such a medium may be a memory integrated into the processor, or may be a memory chip that is addressed by the controller to perform control functions. Such firmware, software or microcode is executable by the processing device and when executed, causes the processing device to perform its control, dimming, occupancy detection, and other control functions. Such firmware or software could also be stored in or on a tangible medium such as an optical disk or traditional removable or fixed magnetic medium such as a disk drive used to load the firmware or software into a solid-state lighting system. Such a storage medium may be accessed either directly or over a network, including the Internet.

The various portions of a solid-state lamp or lighting system according to example embodiments of the invention can be made of any of various materials. Heat sinks can be made of metal or plastic, as can the various portions of the housings for the components of a lamp. A system according to embodiments of the invention can be assembled using varied fastening methods and mechanisms for interconnecting the various parts. For example, in some embodiments locking tabs and holes can be used. In some embodiments, combinations of fasteners such as tabs, latches or other suitable fastening arrangements and combinations of fasteners can be used which would not require adhesives or screws. In other embodiments, adhesives, screws, bolts, or other fasteners may be used to fasten together the various components.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A solid-state lighting system comprising:
   a driver to drive a primary light source, the driver connectable to a power line supplying a plurality of solid-state lighting systems within a building, the power line being in turn selectively connected to a main and an emergency inverter or back-up generator of the building;
   a control input to receive a data signal; and
   a processing device connected to the control input and the driver to cause the solid-state lighting system to dim to a specified light output level when the data signal indicates the power line has become connected to the emergency inverter or back-up generator.

2. The solid-state lighting system of claim 1 wherein the processing device causes the solid-state lighting system to switch from the primary light source to an auxiliary light source.

3. The solid-state lighting system of claim 1 wherein the processing device causes the primary light source to dim to the specified light output level.

4. The solid-state lighting system of claim 3 further comprising an occupancy sensor wherein the specified light output level is determined at least in part by an occupancy state of a room.

5. The solid-state lighting system of claim 3 wherein the solid-state lighting system is selectively configurable for the specified output level.

6. The solid-state lighting system of claim 5 wherein the specified output level is for egress.

7. The solid-state lighting system of claim 3 wherein the data signal comprises one of the presence or absence of a wireless signal.

8. The solid-state lighting system of claim 3 wherein the data signal comprises a wired signal.

9. The solid-state lighting system of claim 8 wherein the data signal comprises a closure of a normally open wired contact.

10. A light fixture comprising:
    a plurality of LEDs;
    a driver connected to the plurality of LEDs to receive power from a power line supplying a plurality of solid-state lighting systems within a building and supply power to the plurality of LEDs;
    a control input to receive a data signal;
    a processing device connected to the driver and the control input, the processing device configured to cause the driver to dim at least some of the plurality of LEDs to a specified level when the control input receives a data signal that indicates the power line is now being supplied by an emergency inverter or back-up generator for the building.

11. The light fixture of claim 10 further comprising an occupancy sensor connected to the processing device wherein the specified level is further determined by signaling from the occupancy sensor.

12. The light fixture of claim 10 wherein the data signal comprises a wireless signal or a lack thereof.

13. The light fixture of claim 10 wherein the data signal comprises a wired signal.

14. The light fixture of claim 10 further comprising a configuration input connected to at least one of the driver, the processing device, and the control input, wherein the configuration input provides the specified level.

15. The light fixture of claim 14 wherein the processing device selectively sets the specified level for egress lighting.

16. A method of operating a plurality of lighting systems connected to an incoming power line of a building, the method comprising:
    monitoring, using a processing device, a control input for a data signal that indicates the incoming power line has become connected to an emergency inverter or a back-up generator for the building;
    dimming each of the plurality of lighting systems to a specified level when power begins being supplied by the emergency inverter or back-up generator, the specified level having been selected to reduce power consumption by the plurality of lighting systems; and
    restoring, by the processing device, the plurality of lighting systems to a normal light level when the data signal indicates that the power has stopped being supplied by the emergency inverter or back-up generator for the building.

17. The method of claim 16 further comprising:
    determining an occupancy status of a room where at least one of the plurality of lighting systems is operating; and
    setting the specified level in accordance with the occupancy status of the room.

18. The method of claim 16 wherein the data signal comprises a wireless signal.

19. The method of claim 16 wherein the data signal is provided by a wired connection.

\* \* \* \* \*